D. Hughes,
Rotary Steam Engine.
N°23,466.   Patented Apr. 5, 1859.

Witnesses:
H. F. Hatch
Fred. Dr Lano

Inventor:
Daniel Hughes

UNITED STATES PATENT OFFICE.

DANIEL HUGHES, OF ROCHESTER, NEW YORK.

IMPROVED ROTARY ENGINE.

Specification forming part of Letters Patent No. 23,466, dated April 5, 1859.

*To all whom it may concern:*

Be it known that I, DANIEL HUGHES, of Rochester, in the county of Monroe and State of New York, have invented certain new and useful Improvements in Rotary Engines and Pumps; and I do hereby declare that the following is a full, clear, and exact description of the same, reference being had to the accompanying drawings, forming part of this specification, in which—

Figure 1:
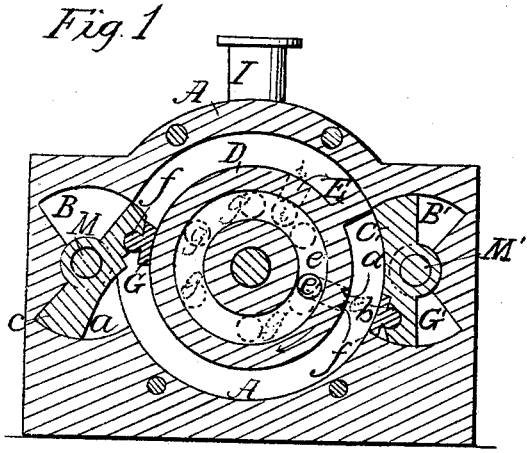
Figure 3:
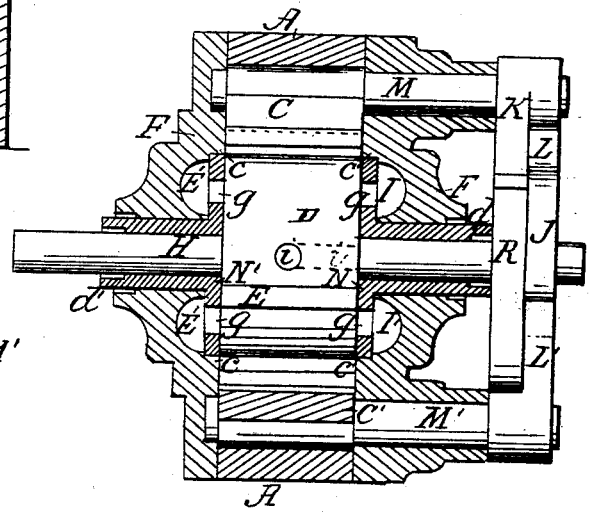
Figure 4:
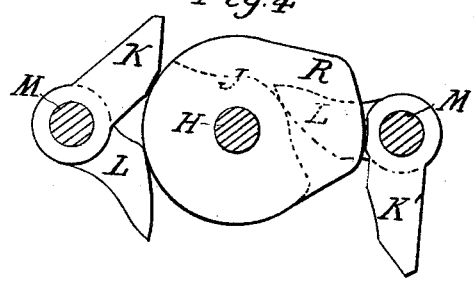
Figure 2:
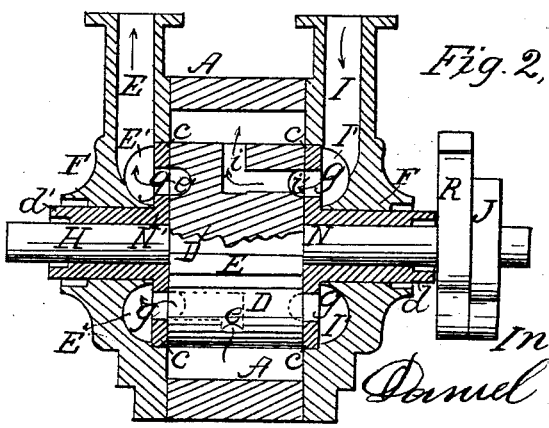

Figure 1 is a vertical section parallel with the planes of revolution of a rotary engine or pump with my improvements. Fig. 2 is a vertical section of the same at right angles to Fig. 1. Fig. 3 is a horizontal section of the same. Fig. 4 represents the cams for operating the abutments.

Similar letters of reference indicate like parts in all the figures.

My invention consists, first, in the employment, in combination with oscillating abutments, of oscillating shoes, applied substantially as hereinafter described, to be operated upon by the pressure of the steam or other fluid which moves or is moved by the engine for the purpose of preventing any leakage between such abutments and the piston-hub.

It further consists in a novel construction of and mode of applying metallic disks between the revolving piston-hub and the cylinder-heads for the purpose of preventing any leakage between said hub and heads.

To enable others skilled in the art to make and use my invention I will proceed to describe its construction and operation.

A is the cylinder, having two recesses B B', one on each side, to receive the oscillating abutments C C', the axes of which are equidistant from and parallel with and both in the same plane with the axis of the cylinder. The said recesses B B' are of a cylindrical form, though they need not consist of complete cylinders, but only such portions of cylinders (shown in Fig. 1) as are sufficient to permit the necessary oscillation of the abutments, which are turned to fit the said recesses. The radius of the abutments should be somewhat greater than the distance of their axes from the periphery of the cylindrical rotating hub D, which is secured to the main shaft and to which the radial piston E is rigidly attached. The cylinder A is fitted with movable heads F F, which are perpendicular to its axis, and which also close the ends of the recesses B B', in which the abutments C C' work. These abutments have concentric shafts M M', which work in bearings in one of the heads F F without passing through it, but which pass through stuffing-boxes in the opposite head. The said abutments are each faced on one side $a$ to such form as to constitute a continuation of the interior of the cylinder when in a proper position to do so, as shown at the right hand of Fig. 1.

G G' are the shoes, which are so constructed and attached to the abutments, one to each, by close-fitting joints $f f$ that either may lie against a suitable bearing $b$ in a recess in its respective abutment and so form a continuation of the face $a$, as shown in the right hand of Fig. 1, or may bear against the cylindrical surface of the rotating piston-hub, as shown at the left of the same figure. The abutments are shifted from one to the other of the two positions or conditions exhibited in Fig. 1 by two cams R J upon the main shaft H and two toes K L or K' L' on their respective shafts M M', the forms of which cams and toes are represented in Fig. 4.

The piston-hub D and piston E are made of the same length as the cylinder and extend all across it. It contains two angular passages $i$ and $e$ of similar form, one establishing a communication between a concentric groove $i'$ in one end of the said hub and the channel that is formed between the outer periphery of the piston-hub and the inner periphery of the cylinder, and the other a communication between a concentric groove $e'$ in the opposite end of said hub and said channel, the said passages having their openings in the periphery of the hub on opposite sides of the piston. The main induction-passage I, to which the induction-pipe connects, is formed in one cylinder-head, and the main eduction-passage E, with which the eduction-pipe connects is formed in the other cylinder-head, the said passages communicating with similar channels I' and E', formed within the inner faces of the cylinder-heads, said channels being concentric with the axis of the cylinder and main shaft and opposite to the grooves $i'$ and $e'$ in the piston-hub.

N N' are the disks, which are interposed between the ends of the piston-hub and cylinder-heads, the said disks being of a circumference about equal to that of the piston-hub and having their peripherical surfaces perfectly cylindrical and fitted perfectly steam-tight or water-tight into cavities $c\ c$, formed in the interior of the cylinder-heads. The said disks have their inner faces fitted closely to the ends of the piston-hub D, and are made with concentric cylindrical sockets $d\ d'$ on their outer sides to fit to the main shaft H and to surround the same where it passes through the cylinder-heads, and these sockets $d\ d'$ are intended to be fitted with stuffing-boxes both outside and inside to prevent leakage between them and the cylinder-heads and the main shaft. The said disks have each several holes $g\ g$ to form communication between the channels I' E' in the cylinder-heads and the grooves $i'\ e'$ in the piston-hub D.

I will now describe the operation as an engine, and a few words will afterward be sufficient to explain the operation as a pump. The steam or other fluid entering by the induction-pipe I into the channel I' passes through the holes $g\ g$ of the disk N into the groove $i'$ of the piston-hub, and from thence through the passage $i$ into the cylinder and drives the piston in the direction of the black arrow shown on the piston-hub in Fig. 1, while the exhaust-steam escapes from before the piston through the passage $e$, groove $e'$, the holes $g\ g$ of the disk N', the channel E', and pipe E, the abutments being respectively brought into the operative condition shown at the left hand of Fig. 1 and moved out of the way, as shown at the right of the same figure, to let the piston pass, by the operation of the cams R J on the main shaft upon the toes K L K' L' on the abutment-shafts, the abutments being thus moved without difficulty, as they are balanced by the pressure of the steam on the face $a$ on opposite sides of the axis. The shoes G G are brought to the condition shown in Fig. 1 by being pressed against the piston-hub as the abutments move out, and when in contact with said hub are kept close up to it to make a steam-tight working-joint by the pressure of the steam on the edges which are nearest the peripheries of their respective abutments, and said shoes are brought to the position shown at the right hand of the figure by the pressure or friction of the edge of each shoe against its respective cavity B or B' as its respective abument retires within the cavity. The disks N N' may be kept close up to the ends of the piston-hub by means of springs or screws applied either within or without the cylinder-heads, though such means of forcing them up may hardly be necessary on the induction side, as the pressure of the steam may be made to hold up the disk on that side. These disks, being provided with sockets fitted into and passing through the cylinder-heads and fitting to the main shaft, are caused always to move square up to the piston-hub, and thus permitted to be set up with the required degree of tightness without the danger of binding at any point, to which the rings or annular plates frequently applied for the same purpose are so liable.

The operation as a pump is essentially the same as the operation as an engine—that is to say, on the shaft H being turned in the direction of the arrow the induction and eduction of the water is in the same direction as that of the steam or other motive agent, and the operation of the abutments and their shoes precisely the same as when operating as an engine.

The direction of the revolution of the pump or engine may be reversed by the use of a proper valve and passages to convert the passage E into an induction-passage and I into an eduction-passage.

What I claim as my invention, and desire to secure by Letters Patent, is—

1. The oscillating shoes G G', applied and operating in combination with the oscillating abutments and the rotating piston-hub, substantially as and for the purpose herein described.

2. The disks N N', having openings $g\ g$ and sockets $d\ d$, applied in combination with the rotary piston-hub, the cylinder-heads, and the main shaft, substantially as and for the purposes herein described.

DANIEL HUGHES.

Witnesses:
H. F. HATCH,
FRED. DE LANO.